ELECTRONIC INTERPOLATING TIME SHARING FUNCTION GENERATORS

Filed Sept. 2, 1959 3 Sheets-Sheet 1

INVENTOR
AMOS NATHAN
By Ostrolenk, Faber, Gerb & Soffen
ATTORNEYS

ELECTRONIC INTERPOLATING TIME SHARING FUNCTION GENERATORS

Filed Sept. 2, 1959 3 Sheets-Sheet 2

INVENTOR
AMOS NATHAN
BY Ostrolenk, Faber, Gerb & Soffen
ATTORNEYS

Sept. 3, 1963 A. NATHAN 3,102,951

ELECTRONIC INTERPOLATING TIME SHARING FUNCTION GENERATORS

Filed Sept. 2, 1959 3 Sheets-Sheet 3

INVENTOR
AMOS NATHAN
By Ostrolenk, Faber, Gerb & Soffen
ATTORNEYS

United States Patent Office 3,102,951

Patented Sept. 3, 1963

3,102,951
ELECTRONIC INTERPOLATING TIME SHARING FUNCTION GENERATORS

Amos Nathan, 17 Lamed Heh Ave., Ramoth Remez, Haifa, Israel

Filed Sept. 2, 1959, Ser. No. 837,618
10 Claims. (Cl. 235—197)

This invention relates to electronic interpolating function generators of one or more dimensions portions of which are operated sequentially on a time sharing basis. More specifically, a function generator of this invention produces an output signal which is equal to the piecewise-linear interpolation over function values given at the lattice points of a regular lattice in the space of the variables, in which said function values are independently adjustable.

One example in which such a function generator is useful is an electronic analog computer. In such a computer it is desirable that a function generator can be easily adjusted to generate different functions. Another example is interpolation in conjunction with digital storage of the given function values.

Multivariate function generators of this type, but not using the time sharing methods of this invention, are described in my following U.S. application entitled "Multivariate Interpolating Function Generators," filing date at U.S. Patent Office: March 24, 1959, Serial No. 801,469.

It is an object of this invention to provide means for the implementation of electronic function generators providing the piecewise-linear interpolation to a function for given instantaneous values of the variables in time sharing circuits, thus simplifying the complexity of the circuits.

Other objects of this invention will become apparent from the following description taken in connection with the accompanying drawings, in which FIGURE 1 is a plot of the function $$\Delta^1\left(\frac{x-i\Delta x}{\Delta x}\right)$$

Figure 1:
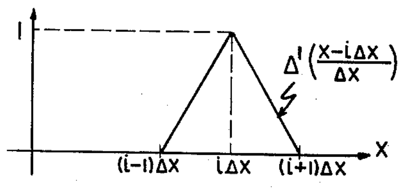
Figure 2:
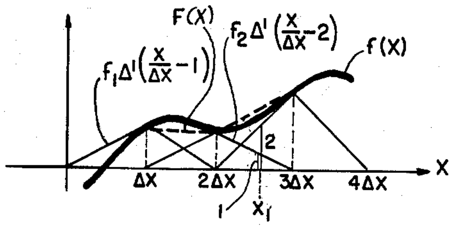
FIGURE 2 shows the principle underlying the use of functions for the generation of a given one-dimensional function $f(x)$.

The piecewise-linear interpolation $F(x)$ of a function $f(x)$ of the variable $x$ can be written $$(1) \qquad F(x)=\sum_i f_i\Delta^1\left(\frac{x-i\Delta x}{\Delta x}\right)$$

where $$\left(\frac{X-i\Delta X}{\Delta X}\right)=\xi$$

and where $\Delta^1(\xi)$ is defined by $$(2) \qquad \Delta^1(\xi)=\text{Max}\{0, \text{Min}(1+\xi, 1-\xi)\}$$

and the summaion of (1) extends over a range of adjacent integer values of $i$, and $$(3) \qquad f_i=f(i\Delta x)$$

is the $i$th lattice point function value of $f(x)$, i.e. its value at $\Delta x=i\Delta x$. $\Delta x$ is the lattice spacing, the one-dimensional lattice defined by $x=i\Delta x$ being called regular because the spacing between adjacent lattice points $i\Delta x$ is constant. $F(x)$ is an approximation to $f(x)$ within the range $$i_{\min}\Delta x \leqq X \leqq i_{\max}\Delta x$$

where $i_{\min}$, $i_{\max}$ designate the smallest and largest values of $i$, respectively, provided $f(x)$ is sufficiently smooth. FIGURE 1 shows $$\Delta^1\left(\frac{x-i\Delta x}{\Delta x}\right)$$

where $\Delta^1$ represents the electronic operator for producing the triangle function $$\Delta^1\left(\frac{X-i\Delta X}{\Delta X}\right)$$

shown in FIGURE 1 in the manner described in my co-pending U.S. applications No. 837,619 entitled "General Purpose Transistorized Function Generator" and No. 837,614, entitled "General Purpose Compensated Diode Function Generator," which applications describe triangle function generators in greater detail and are incorporated herein by reference and FIGURE 2 shows how $f(x)$ is approximated by Equation 1. $F(x)$ is exactly to $f(x)$ at lattice points $i\Delta x$ and is a linear function of $x$ between adjacent lattice points. It is sometimes better to choose values of $f_i$ which differ slightly from $f(i\Delta x)$ in order to obtain a better average correspondence of $F(x)$ with $f(x)$.

In $n$ dimensions, where $n\geqq 2$, let the $n$ coordinates of a point in $n$ space be denoted by $$x_{0\alpha};\ \alpha=1, 2, \ldots, n$$

Introducing additional (dependent) coordinates $x_{\alpha\beta}$ through equations $$(4) \qquad x_{0\alpha}+x_{0\beta}-x_{0\beta}=0$$

where $$\alpha<\beta$$
$$\alpha=1, 2, \ldots, {}^{n-1}$$
$$\beta=2, 3, \ldots, n$$

there is now a total of $m=n\cdot(n+1)/2$ coordinates, of which $n$ are independent. A lattice point $x_{0\alpha}$ coordinate will be denoted as follows:

$$(5) \qquad \bar{\gamma}_{0\alpha}=(\gamma_{0\alpha})\Delta x_{0\alpha}$$

where $$(6) \qquad \gamma_{0\alpha}=m_{0\alpha}+\mu$$

where $$\mu=1, 2, \ldots, n_{0\alpha}$$

and $m_{0\alpha}$, $n_{0\alpha}$ are suitable integers.

At the lattice points, coordinate $x_{0\alpha}$ therefore takes on $n_{0\alpha}$ adjacent values spaced by $\Delta x_{0\alpha}$, where the lattice spacing of the $x_{0\alpha}$ coordinate is $\Delta x_{0\alpha}$. Said spacings are given for the $n$ independent coordinates. This scheme defines a regular lattice.

For the $\alpha\beta$ coordinate, $\bar{\gamma}_{\alpha\beta}=x_{\alpha\beta}$, of any lattice point holds, therefore, $$(7) \qquad \bar{\gamma}_{0\alpha}+\bar{\gamma}_{\alpha\beta}-\bar{\gamma}_{0\beta}=0$$

and $$(8) \qquad \gamma_{\alpha\beta}={}^{m}{}_{\alpha\beta}+\mu$$
$$\mu=1, 2, \ldots, n_{\alpha\beta}$$

where $\alpha,\beta$ assume the same range of values as before. This determines the lattice point spacing of the $\alpha\beta$ coordinate, $\Delta x_{\alpha\beta}$, through $$\gamma_{\alpha\beta}\Delta x_{\alpha\beta}=\overline{\gamma}_{\alpha\beta}$$

Let $f\gamma_{01}\gamma_{02}\ldots\gamma_{0n}$ denote the given lattice point function value at lattice point $\overline{\gamma}_{01}\overline{\gamma}_{02}\ldots\overline{\gamma}_{0n}$. Let $$F(x_{01}, x_{02}, \ldots, x_{0n})$$

denote the required piecewise-linear interpolation function of the given lattice point function values. Then it can be shown that (9)

$$F(x_{01}, x_{02}, \ldots, x_{0n})=\sum_{\gamma_1\gamma_2\ldots\gamma_n} f_{\gamma_1\gamma_2\ldots\gamma_n}\Delta^n\left\{\left(\frac{x_{01}}{\Delta x_{01}}-\gamma_{01}\right), \left(\frac{x_{02}}{\Delta x_{02}}-\gamma_{02}\right), \ldots, \left(\frac{x_{0n}}{\Delta x_{0n}}-\gamma_{0n}\right)\right\}$$

where the summation extends over all given lattice points, and where $\Delta^n\{\ldots\}$ is defined by (10)

$$\Delta^n\left\{\left(\frac{x_{01}}{\Delta x_{01}}-\gamma_{01}\right), \left(\frac{x_{02}}{\Delta x_{02}}-\gamma_{02}\right), \ldots, \left(\frac{x_{0n}}{\Delta x_{0n}}\right)\right\}$$
$$=\text{Min}\left\{\Delta^1\left(\frac{x_{01}}{\Delta x_{01}}-\gamma_{01}\right), \Delta^1\left(\frac{x_{02}}{\Delta x_{02}}-\gamma_{02}\right), \ldots, \Delta^1\left(\frac{x_{12}}{\Delta x_{12}}-\gamma_{12}\right), \Delta^1\left(\frac{x_{n-1,n}}{\Delta x_{n-1,n}}-\gamma_{n-1,n}\right)\right\}$$

A complete mathematic development of the above equations is set forth in my publication entitled, "Simplicial Coordinates and Piecewise Linear Interpolation in a Regular N-Dimensional Lattice," published May 2, 1959 by the Technion-Israel Institute of Technology and is incorporated herein by reference.

The present invention relates to devices for the production of signals representing the expressions of Equations 1 and 9, in the one- and multi-variate cases, respectively, such that each term in the sum on the right-hand side of these expressions is produced in time-sequence, said sequence being periodically repeated, thus producing a series of pulses, respectively representing the successive terms in these expressions. The average of these pulses, produced by passing said series through a low-pass filter then represents the required sum.

One embodiment of the one-dimensional function generator of this invention will be described in conjunction with FIGURE 3 in which 3, 4 are commutators, which are shown schematically as linear bars, whereas actually they will usually be arranged in a circular fashion, so that the last segment of each commutator is again adjacent to the first. The $n$ segments of 3 are held at voltages $x_1, x_2, \ldots, x_i, \ldots, x_n$, respectively, where we have written $x_i=i\Delta x$. The $n$ segments of 4 are held at voltages $g_1, g_2, \ldots, g_i, \ldots, g_n$, respectively. Brushes 5 and 7 contact corresponding segments of 3 and 4, respectively. The brushes are mechanically coupled for this purpose. 9 is a function generator $\Delta$, fed at terminal 10 by the voltage of 6 and at terminal 11 by voltage $x$ which represents the independent variable of the function generator.

The output of $\Delta$, at terminal 12, represents $\Delta^1(x-x_i)$.

A function generator such as $\Delta$ can be implemented by the prior art. 13 is a multiplier M whose input terminals 12 and 14 are fed with the output of $\Delta$ and the voltage of 8, respectively. The output voltage of M at terminal 15 is therefore proportional to $g_i\Delta^1(x-x_i)$.

This voltage is fed to amplifier unit A, 16, which is also a low-pass filter with a time constant large with respect to the duration of a complete sweep of the commutator. Its output voltage at 17 is therefore proportional to $$\sum_{i=1}^{n} g_i\Delta^1(x-x_i)$$

The voltages $x_i$ are so adjusted that $$x_i=i\Delta x+x_0;\ i=1, 2, \ldots, n;$$

where $\Delta x$, $x_0$ are constant voltages. Adjusting $g_i$ so that $$g_i=f_i=f(x_i)$$

the output of the function generator, at 17, becomes proportional to $F(x)$, Equation 1, provided the "on" times of all commutator segments, i.e. the durations during which they are in contact with a brush, are equal. Equality of "on" times need not be strictly enforced in the function generators of this invention. It is merely necessary to adjust $g_i$ such that $g_i=k_if_i$, where $k_i$ are constant factors determined experimentally, such that the function-generator yields an output signal representing $f_i$ when $x=i\Delta x$.

Figure 4:
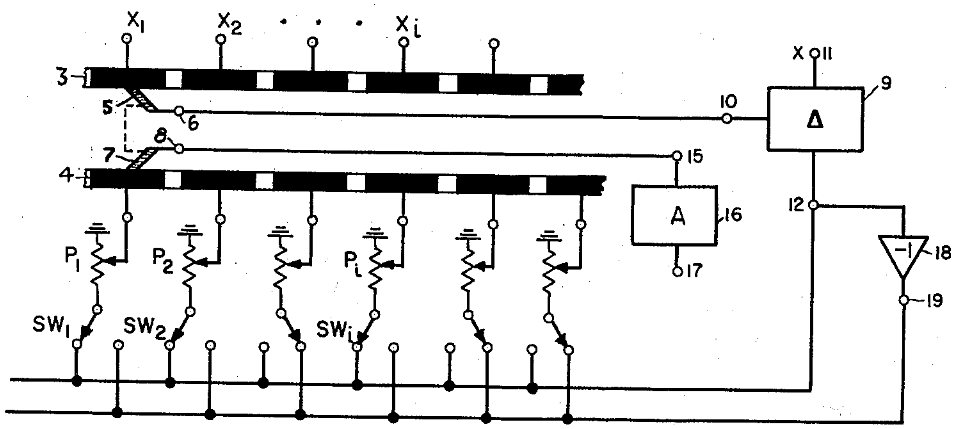
FIGURE 4 is a schematic diagram of another embodiment of a one-dimensional function generator of this invention.

A similar embodiment of a one dimensional function generator of this invention will be described in connection with FIGURE 4. This embodiment requires one multiplier per lattice point. FIGURE 4 relates to an example in which the storage of the magnitudes of lattice point function values is effected in potentiometers, which are simultaneously used to yield the required multiplication. The sign of $f_i$ is stored in the setting of a switch.

Figure 3:
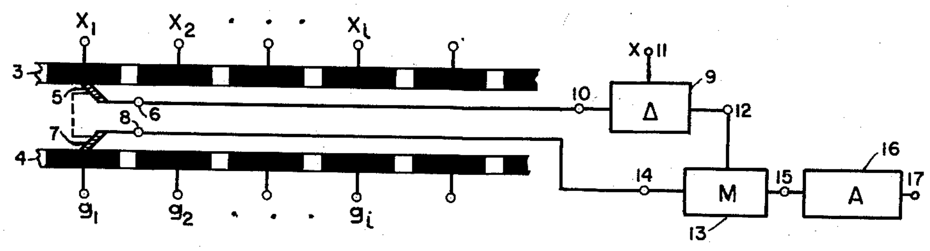
FIGURE 3 is a schematic diagram of one embodiment of a one-dimensional function generator of this invention.

In FIGURE 4, 3 to 12 inclusive, and their interconnections, are identical to those of FIGURE 3. The output of $\Delta$, at terminal 12, is changed in sign in sign-changer 18, whose output terminal 19 is therefore at the negative of the potential of terminal 12. One side of each potentiometer $P_i$; $i=1, 2, \ldots, n$; is grounded, whereas the other side is connected to 12 or 19 through change-over means $SW_i$. The setting of the sliding contact of $P_i$ corresponds to the required value of $f_i$; and the setting of the change-over means corresponds to its sign. The settings of $P_i$ and $SW_i$ thus store $f_i$ both in magnitude and sign. Terminal 8 of brush 7 which is at the sequence of the output voltages of potentiometers $P_i$; $i=1, 2, \ldots$; when it moves along 4, is connected to input terminal 15 of amplifier A, 16, which provides an output voltage at terminal 17. A of FIGURES 3 and 4 correspond to each other. Amplifier 16 functions also as a low-pass filter and an impedance converter, presenting high input impedance at 15 and providing low output impedance at 17. The modulus of $g_i$ depends upon the setting of the associated potentiometer $P_i$ and is continuously adjustable between 0 and 1. Filter-amplifier A has a time constant large with respect to the duration $T_0$ of a complete sweep of a commutator. The average contribution of segment $i$ of the commutator to the voltage at 15 is therefore proportional to $$(\Delta T_i/T_0)g_i\Delta^1(X-X_i)$$

where $\Delta T_i$ is the time during which 7 contacts the $i$th segment of 4.

For adjustment of the function generator make $x=x_i$ and adjust $P_i$ for correct output at 17. $g_i$ is approximately equal to $f_i$ because $\Delta T_i$ is approximately independent of $i$ and the speed with which the commutator is swept is constant.

The voltage at terminal 15 of the function generator consists of two pulses per sweep of the commutator, such as, for example, the pulses 1 and 2, respectively, of FIGURE 2.

One embodiment of the $\Delta$ function generator used in this example will be described in connection with FIGURE 5 in which 10, 11 are the input terminals for $-x_i=-i\Delta x$ and $x$, respectively. Thus the sign of $x_i$ in FIGURES 3 and 4 is to be reversed in this example. In this example the commutator is scanned 10 times per second which corresponds to a period $T_0=0.1$ second. There are 20 segments per commutator so that 20 adjustable function values are provided in the function generator. The "on" time $T_{on}$ of a segment is therefore 5 milliseconds minus $T_{off}$, where $T_{off}$ is the time during which the brush is in transition between a segment and the next without contacting either. In this example $T_{on}=4$ milliseconds; $T_{off}=1$ millisecond. 20 is a capacitor of capacitance C=10,000 picofarad in this example) for storing voltage $x_i$ during the off time. $\Delta x=5$ volts, in this example. Output impedance at terminal 10 depends upon $i$ and did not exceed 6 kiloohms in this example. 11 is the input terminal for $x$. 21 is the input terminal for a constant voltage (−50 volts) and 22 is a potentiometer (50 kiloohms). 23 is a sign changing adder. The voltage at output terminal 24 of 23 is equal to $$k'\Delta x\left[1-\frac{x-x_i}{\Delta x}\right]+V_0$$

where $k'$ is the amplification of 23, and $V_0$ is a constant voltage. This voltage and a constant adjustable voltage from the output terminal of potentiometer 26 (50 kiloohms) which is fed at terminal 25 by a constant voltage (−50 volts) are fed to sign changer 27 whose amplification is equal to that of 23. With proper adjustment of potentiometer 26 the output voltage at 28 is equal to $$k'\Delta x\left[1+\frac{x-x_i}{\Delta x}\right]+V_0$$

Potentiometer 30 (50 kiloohms) with input terminal 29 which is fed with a constant voltage (+50 volts or −50 volts, as required by the adjustment procedure) and impedance converter 31 (a conventional cathode follower in this example) provide an adjustable low impedance voltage at terminal 32. The voltages of terminals 24 and 28 are fed via resistors 33 and 34 (2.2 kiloohms each) to diodes 36, 37, respectively, with common output connection which is also connected to a negative voltage at 41 (−250 volts) through resistor 40 (1 megohm). This circuit provides at said common diode junction the larger of the two voltages of 24 and 28, approximately. Similarly, diodes 38 and 39 with common output connection at terminal 44 which is also connected to a positive voltage (170 volts) at 43 through resistor 42 (2 megohms), fed respectively from said first common diode junction and from 32 through resistor 35 (2.2 kiloohms) provides at 44 the smaller of the voltages at said first common junction and 32, approximately. Output terminal 12 of impedance converter 45 (a conventional cathode follower) is therefore at voltage $$k\Delta x\cdot\Delta^1\left(\frac{x-x_i}{\Delta x}\right)$$

where $k$ is a constant (10 in this example) depending upon its amplication and proportional to $k'$, provided potentiometers 22, 26, and 30 are suitably adjusted. Resistors 33, 34, 35 are provided and the voltages at 41, 43 and resistors 40, 42 are so chosen that the corners of the output characteristic are suitably rounded off. The idealized output characteristic is represented graphically in FIGURE 1. Because of deviations of actual diode characteristics from the ideal and non-vanishing input impedances into the diodes of the circuit of FIGURE 5, both the apex of the triangle of FIGURE 1 and the corners at its base line are rounded off, resulting in imperfections in the combined characteristic of the function generator, the combined characteristic being shown in FIGURE 2. Some rounding off of corners is desirable as it makes the sensitivity of the function generator to errors in the spacings of lattice points $x_i$ less critical. The values in the described example are so chosen that the errors of the function generator are minimized if the function generator is adjusted to produce a constant output, i.e. when $$f_1=f_2=\ldots=f_i=\ldots=f_m=\text{const.}$$

Diodes 36, 37, 38, 39 in this example are silicon junction diodes.

Figure 5:
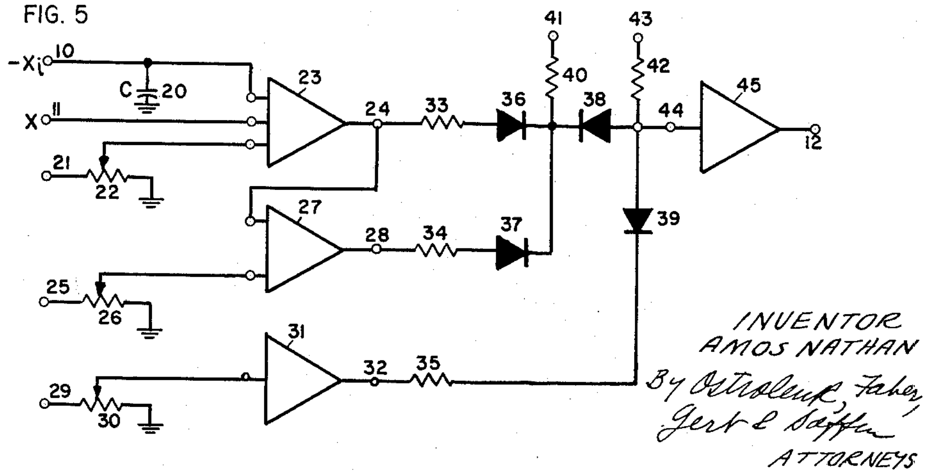
FIGURE 5 is a schematic diagram of one embodiment of a unit corresponding to the Δ units of FIGURES 3, 4, 6 and 7, for the production of $\Delta^1$ functions.

The circuit of FIGURE 5 shows one embodiment for the production of a signal representing $$\Delta_1[(x-x_i)/\Delta x]$$

other examples are readily designed; for example, sign changing amplifiers 23 and 31 can be replaced by cathode followers involving only minor changes in the circuit.

One embodiment of a two-dimensional function generator of this ivention will be described in connection with FIGURE 6 in which 3, 60, 67 are commutators whose segments are fed with signals representing $x_{1i}$, $x_{2j}$, $x_{3k}$, respectively where 67 is scanned such that $k=-i+j$. In this two-dimensional case there are three coordinates, namely $x_{01}$, $x_{02}$, $x_{12}$ and Formula 9 is to be used with $n=2$. We use the following changed notation:

$$x_{02}=x_1;\ x_{02}=x_2;\ x_{03}=x_3;\ \bar{\gamma}_{01,i}=x_{1i};\ \bar{\gamma}_{02,j}=x_{2j};\ \bar{\gamma}_{12,ij}=x_{3k};$$

were subscripts $i$, $j$, $ij$, designate the number of the respective lattice point coordinate. Δ units 12, 63, 70 for the production of functions $$\Delta^1\left(\frac{x_1-x_{1i}}{\Delta x_1}\right);\ \Delta^1\left(\frac{x_2-x_{2j}}{\Delta x_2}\right);\ \Delta^1\left(\frac{x_3-x_{3k}}{\Delta x_3}\right)$$

respectively, are respectively fed through brush 5 and terminals 6 and 10 by $x_{1i}$ and at terminals 65 by $x_2$; through brush 61 and terminals 62 and 64 by $x_{2j}$ and at terminal 65 by $x_2$; and through brush 68 and terminals 69 and 71 by $x_{3k}$ and at terminal 72 by $x_3$; thus producing said respective $\Delta^1$ functions at terminals 12, 66, 73, respectively, which are fed to a "Min" circuit, 75, which produces at its output terminal 12 the smaller of its input signals and zero. 12 is therefore at a potential representing $$\Delta^2\left(\frac{x_1-x_{1i}}{\Delta x_1},\ \frac{x_2-x_{2j}}{\Delta x_2}\right)$$

This signal is multiplied in multiplier M, 13, with a signal representing $g_{ij}$ which is fed to it via commutator 4, brush 7 and terminals 8 and 14. 7 is moved in conformity with the values $i$ and $j$ of the position of brushes 5 and 61, of commutators 3 and 60, respectively. The signal corresponding to said product is produced at terminal 15 and amplified and smoothed by the filtering amplifier A, 16, producing the output signal at 17.

Figure 6:
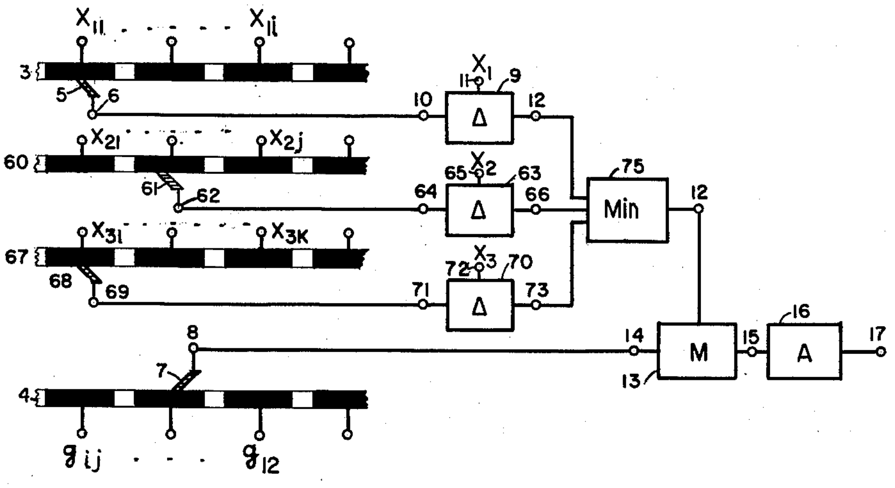
FIGURE 6 is a schematic diagram of one embodiment of a two dimensional function generator of this invention.
Figure 7:
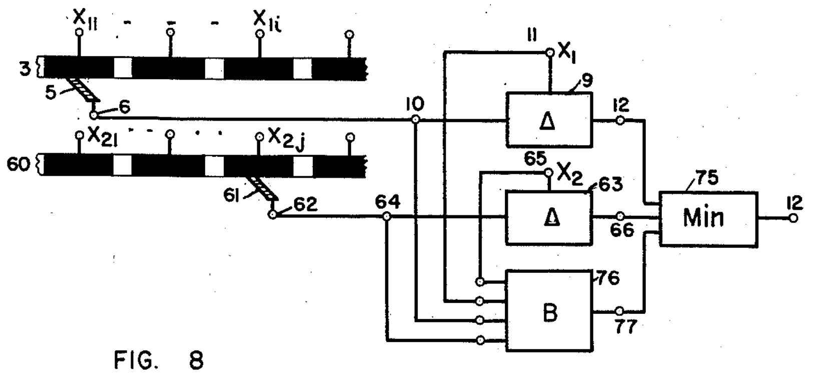
FIGURE 7 is a schematic diagram of a modification of the embodiment of FIGURE 6, providing another embodiment of the two dimensional function generator of this invention.

Another embodiment of the two-dimensional function generator of this invention will be described in connection with FIGURE 7 in which a modification of the embodiment of FIGURE 6 is shown, replacing components 67 to 73 inclusive thereof by components 76 and 77, the remainder of the circuits being identical. Unit B, 76 in FIGURE 7, is fed with signals representing $x_{1i}$, $x_{2j}$, $x_1$ and $x_2$ at terminals 10, 64, 11, and 65, respectively. B is such as to produce therefrom at terminal 77 a signal representing $$\Delta^1\left(\frac{x_3-x_{3k}}{\Delta x_3}\right)$$

i.e. a signal identical to that produced by 70 at 73 (FIGURE 6). B can be implemenented by the prior art, as its output is derived by linear combinations of signals and selections of the larger, respectively smaller, of two signals.

Embodiments of this invention implementing n-dimensional function generators will be quite clear from the foregoing description.

Embodiments corresponding to FIGURE 6 require $n\cdot(n+1)/2$ commutators for lattice point variables and the same number of Δ units; embodiments corresponding to FIGURE 7 require $n$ commutators for lattice point variables, $n\cdot(n+1)/2-n=n\cdot(n-1)/2$ B units, and $n\Delta$ units. In addition one or more commutators are required in each case for lattice point function values.

Multidimensional embodiments of this invention corresponding to the one dimensional embodiment of FIGURE 4 require the use of one multiplier per lattice point. 2-respectively 3-dimensional examples of such embodiments will be described in connection with FIGURES 8 and 9, respectively, for the case in which said multipliers are potentiometers. As in the example of FIGURE 4 the potentiometers also serve as storage elements for the lattice-point function values.

Figure 8:
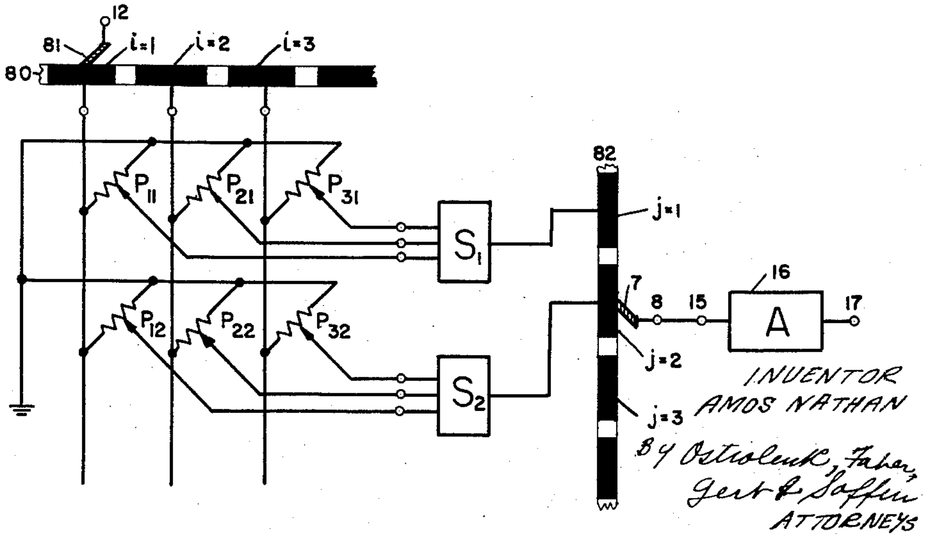
FIGURE 8 is a diagram of a two dimensional potentiometer selection matrix.
Figure 9:
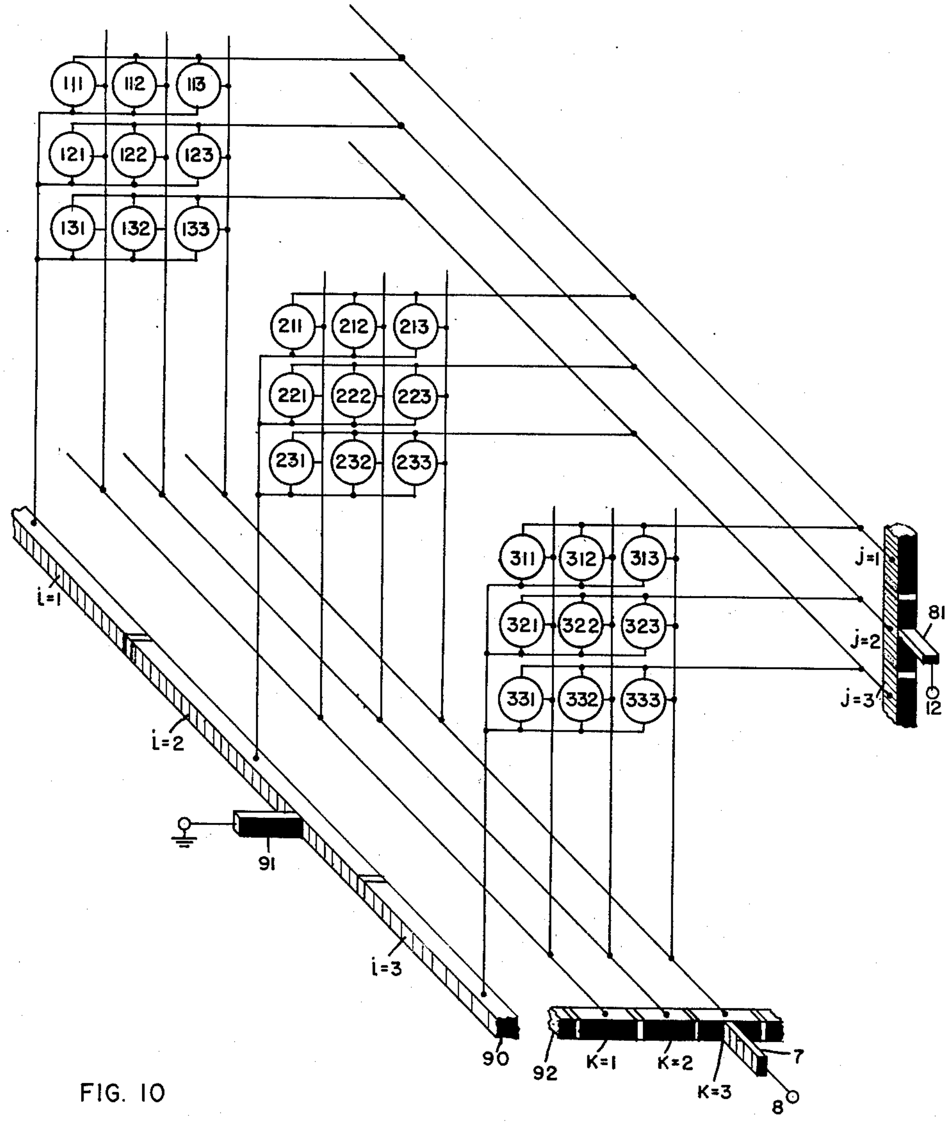
FIGURE 9 is a digaram of a three dimensional potentiometer selection matrix.

In one two dimensional embodiment, the device of FIGURE 7 is used to produce the appropriate $\Delta^2$ signal at terminal 12 as before, said signal now being fed via brush 81 to commuator 80 (FIGURE 8). Brush 12 of FIGURE 8 is coupled to brush 5 of FIGURE 7, so that corresponding commutator segments are simultaneously contacted. Commutator 82 is traversed by brush 7 which is now coupled to brush 61 of FIGURE 7, again so that corresponding commutator segments are simultaneously contacted. 7, 8, 15, 16, 17 correspond to the components of FIGURE 4 with the same designations. One potentiometer $P_{ij}$ is provided per lattice point $(ij)$. One side of all $P_{ij}$ is grounded. The other side of $P_{ij}$ is connected to the $i$-th segment of commutator 80. The adjustable contact of $P_{ij}$ is connected to summing means $S_j$ whose output is connected to bar number $j$ of 82. The input impedance into $S_j$ must be large with respect to the resistance of $P_{ij}$. In one example, the resistance of $P_{ij}$ was 50 kiloohms and the input impedance into $S_j$ was 1 megohm, $S_j$ consisting of a passive resistive summing network. Brushes 81, 7 "select" potentiometer $P_{ij}$, corresponding to lattice point $(ij)$, in the sense that the signal at 8 is proportional to the signal at 12 and to a constant depending upon the setting of $P_{ij}$, and substantially independent of the settings of any other potentiometer $P_{kl}$.

An example of a three-dimensional embodiment of the potentiometer selecting matrix will be described in connection with FIGURES 9 and 10 in which each potentiometer unit $(ijk)$, which has three terminals $T_i$, $T_j$, $T_k$, is connected to segments $i, j, k$ of commutators 90, 80, 92, respectively. We simplify the notation for this case, writing now $x_{01}=x_1$; $x_{02}=x_2$; $x_{03}=x_3$; $\bar{\gamma}_{01,i}=x_{1i}$; $\bar{\gamma}_{02,j}=x_{2j}$; $\bar{\gamma}_{03,k}=x_{3k}$; where $i, j, k$ designate the number of the respective lattice point coorinate.

Figure 10:
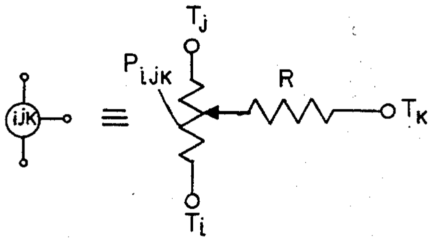
FIGURE 10 is a diagram specifying one embodiment of potentiometer unit $ijk$ of FIGURE 9.

FIGURE 10 shows potentiometer unit $(ijk)$ consisting of potentiometer $P_{ijk}$ with terminals $T_i$ and $T_j$, its sliding contact connected through resistor R to terminal $T_k$. R is large with respect to the resistance of the potentiometer; in one example the resistance of the potentiometer was 50 kiloohms and R was 1 megohm. In FIGURE 9, brushes 91, 81, and 7 contact commutators 90, 80, and 92, respectively; said brushes are coupled to the corresponding brushes selecting lattice point variables $x_{1i}$, $x_{2j}$, $x_{3k}$, respectively. Brush 91 is grounded; brush 81 is fed from terminal 12 by a signal reperesenting $$\Delta^3\left(\frac{x_1-x_{1i}}{\Delta x_1}, \frac{x_2-x_{2j}}{\Delta x_2}, \frac{x_3-x_{3k}}{\Delta x_3}\right)$$

and brush 7 provides at terminal 8 an output signal proportional to the signal at terminal 12 and to a constant depending upon the setting of $P_{ijk}$ and substantially independent of the setting of any other potentiometer $P_{lmn}$.

The examples described in connection with FIGURES 8 and 9 do not embody the provision for negative sign of lattice-point function values as in the one-dimensional embodiment of FIGURE 4. Said feature is, however, readily introduced in these embodiments; for example, by associating switching means in conjunction with each potentiometer and providing sign changing means at the output terminals of each commutator segment of commutators 80 in FIGURES 9 and 10.

This invention can also be used in combination with conventional function generators. For example, one embodiment of a two dimensional function generator using a plurality of one dimensional function generators will be described. Let the function to be generated by $f(x,y)$ where $x$, $y$ are the independent variables. Moreover, write $$f_j(x)=f(x_1y_j)\,ij=1,2.\ \ldots\ 1ni$$

where $$y_{j+1}-y_j=\Delta y$$

independently of $j$.

Let $f_j(x)$; $j=1,2, \ldots n$; be produced by $n$ one-dimensional function generators, not necessary of this invention. For any instantaneous value of $x$ we thus have $n$ signals, the $j$-th of which represents $f_j(x)$. Using these signals as inputs to the respective segments of commutator 4 of the one-dimensional function generator of this invention (FIGURE 3), we have a two-dimensional function generator which produces as output signal an approximation to $f(x,y)$ for the instantaneous values of $x$ and $y$.

Similarly, a plurality of two-dimensional function generators can be combined with the one-dimensional function generator of this invention to produce a function of three variables, and the embodiment of this and other similar function generators will be quite clear from the above description.

Although the above description assumed mechanical commutators, connecting the associated brushes with a sequence of contacts, this is to be understood by way of example only. Any device connecting a terminal to a plurality of other terminals in sequence can be so used and can be substituted for a commutator in the above description. More generally, any device causing a terminal to assume a sequence of required potentials can be so used. In particular, a plurality of suitably actuated relays or a plurality of suitably actuated electronic gates may serve as commutator. Similarly, any mechanical commutating device used in the production of the sequence of signals representing the lattice point coordinates, such as 3, 5 or 60, 61 in FIGURE 7, for the generation of $x_{1i}=i\Delta x_1$ at 6 and $x_{2j}=j\Delta x_2$ at 62, respectively, can be replaced by any electronic voltage generating means which generates the same sequence of signals and feeds terminals 6 and 62, respectively, such as electronic voltage stepping circuits with automatic reset, in which $x_{1i}$ is stepped by a clock circuit and $x_{2j}$ is stepped by the reset, i.e. after one complete run of the $x_{1i}$ sequence, $x_{2j}$ being reset after each complete run of its sequence, said clock and reset circuits actuating the commutating device 4, 7, FIGURE 6.

I claim:

1. A generator of a function $f$ of N variables ($X_1$, $X_2$, . . . $X_n$) the coordinates of which are $X_{0\beta}$, where $\beta=1, 2, \ldots N$; when N is a positive integer, comprising first means for receiving a plurality of first signals representing the values of said function at the lattice points of a regular N-dimensional lattice; second means having a plurality of input terminals one of said terminals, being adapted to receive N input signals representing said N variables ($X_1$, $X_2$, . . . $X_n$) respectively; third means for receiving a plurality of second signals representing the values of said variables at said lattice points; fourth means for sequentially selecting one of said first signals, said fourth means being adapted to impress the selected first signal upon a second input terminal of said second means; fifth means for sequentially selecting one of said second signals; said fifth means being adapted to impress the selected second signal upon a third input terminal of said second means; sixth means for moving said fourth and fifth selecting means in synchronism over all lattice points; said second means being adapted to generate a first output signal representing the function $\Delta^n$ for said selected lattice point and the instantaneous values of said variables, where $\Delta^n$ is defined as the smaller of $$\Delta^1\left(\frac{X\alpha\beta}{\Delta x_{\alpha\beta}}-\gamma_{\alpha\beta}\right):0\leqq\alpha<\beta\leqq n$$

$X_{\alpha\beta}$ is defined as $$X_{\alpha\beta}=-X_{0\alpha}+X_{0\beta}$$

$\Delta X_{\alpha\beta}$ is the spacing between lattice points, of $X_{\alpha\beta}$; $\gamma_{\alpha\beta}\cdot\Delta_{\alpha\beta}$ is the value of $X_{\alpha\beta}$ at said selected lattice point; and $\Delta^1$ is defined by $$\Delta^1(\xi)=\text{Max.}\{0,\ \text{Min.}(1+\xi,\ 1\overline{X}i\xi)\};$$

$$=\frac{X_{\alpha\beta}}{\Delta X_{\alpha\beta}}-\gamma_{\alpha\beta}$$

said second means including seventh means responsive to said first output signal and said first signal for generating a secondary output representing the product of said first output signal with the value of said function at said selected lattice point; commutator means having a first and a second array of conductive segments; the segments of each array being insulated from each other; each of said segments of said first array being electrically connected to an associated one of said N signals; each of said segments of said second array being electrically connected to an associated one of said second signals representing values at said lattice points.

2. The generator of claim 1 comprising eighth means responsive to said secondary output signal for averaging the secondary output signal, the average of said secondary output signal representing the piece-wise linear interpolation of said function for the instantaneous values of said variables.

3. The function generator of claim 1 comprising a plurality of ninth means connected to said second means for storing said lattice point function values.

4. The function generator of claim 3 in which said ninth means comprises a plurality of potentiometer means for storing the moduli of said lattice point function values and change-over means for controlling the polarity of said lattice point function values.

5. The function generator of claim 1 comprising a plurality of potentiometer means for storing said lattice point function values, said potentiometer means being fed by said primary output signals such that the signals at the adjustable contact of said potentiometer means represent said secondary output signal.

6. The function generator of claim 5 comprising sign changing means connected to said second means for producing the negative of said primary output signal and a plurality of change-over means for connecting said potentiometer means either to said fifth means when said change-over means is in a first position or to the output of said sign changing means when said change-over means is in a second position.

7. The function generator of claim 5 for a function having two independent variables in which the potentiometer means associated with said selected lattice point is selected by first and second selecting means, selecting two of the terminals of said potentiometer means.

8. The function generator of claim 5 for a function having three independent variables in which the potentiometer means associated with said selected lattice point is selected by first, second and third terminal of said potentiometer means.

9. The function generator of claim 1 wherein said seventh means comprises filter means for producing an output which is the average of said secondary output signal.

10. A function generator of the type described in claim 1 wherein said fourth means comprises first and second brush means making sliding contact respectively, with said first and second arrays of conductive segments.

References Cited in the file of this patent

UNITED STATES PATENTS 2,909,722 Cutler ---------------- Oct. 20, 1959